(12) United States Patent
Mizutani et al.

(10) Patent No.: US 9,799,226 B2
(45) Date of Patent: Oct. 24, 2017

(54) ROUTE POINT SETTING DEVICE AND ROUTE POINT SETTING PROGRAM

(71) Applicant: SUBARU CORPORATION, Tokyo (JP)

(72) Inventors: Takuma Mizutani, Tokyo (JP); Yasuhiko Yanase, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 14/968,374

(22) Filed: Dec. 14, 2015

(65) Prior Publication Data
US 2016/0210864 A1  Jul. 21, 2016

(30) Foreign Application Priority Data
Jan. 16, 2015  (JP) ................................ 2015-006337

(51) Int. Cl.
G08G 5/00 (2006.01)
G05D 1/10 (2006.01)
G01C 21/20 (2006.01)

(52) U.S. Cl.
CPC ........... G08G 5/0034 (2013.01); G01C 21/20 (2013.01); G08G 5/0086 (2013.01); G08G 5/00 (2013.01); G08G 5/0047 (2013.01)

(58) Field of Classification Search
None
See application file for complete search history.

(56) References Cited

U.S. PATENT DOCUMENTS

| | | | | |
|---|---|---|---|---|
| 6,259,988 B1 * | 7/2001 | Galkowski | ............. | G01C 21/00 340/989 |
| 6,266,610 B1 * | 7/2001 | Schultz | ................. | G05D 1/101 701/528 |
| 7,761,199 B2 * | 7/2010 | Duranti | ................ | G05D 1/0072 701/25 |
| 8,874,356 B1 | 10/2014 | Bonawitz | | |

(Continued)

FOREIGN PATENT DOCUMENTS

| | | |
|---|---|---|
| JP | 3557445 A | 8/2004 |
| JP | 2015-001377 A | 1/2015 |
| WO | 2013/132517 A2 | 9/2013 |

OTHER PUBLICATIONS

European Search Report EP Application No. 16150532.6 dated May 24, 2016.

*Primary Examiner* — Thomas G Black
*Assistant Examiner* — Demetra Smith-Stewart
(74) *Attorney, Agent, or Firm* — McDermott Will & Emery LLP (57) ABSTRACT

A route point setting device sets route points on a flight route from a first point to a second point. The device includes: a grid divider that divides map information, including the first and second points, into cells in grid form on a horizontal plane; a cell route setter that sets a cell route including consecutive cells between the first and second points; a calculator that calculates a bending angle of the cell route at each cell on the cell route; and a route point setter that performs comparing the bending angle at any cell calculated by the calculator, with the bending angles at two cells adjacent to the any cell and respectively ahead of and behind the any cell on the cell route, and setting the any cell as a cell route point according to a predetermined expression.

5 Claims, 6 Drawing Sheets (56) References Cited

U.S. PATENT DOCUMENTS

2008/0306680 A1* 12/2008 Marty .................... G01C 21/00
  701/533
2016/0210863 A1* 7/2016 Kohn-Rich .......... G05D 1/0646

* cited by examiner

ROUTE POINT SETTING DEVICE AND ROUTE POINT SETTING PROGRAM

CROSS-REFERENCE TO RELATED APPLICATIONS

The present application claims priority from Japanese Patent Application No. 2015-006337 filed on Jan. 16, 2015, the entire contents of which are hereby incorporated by reference.

BACKGROUND

1. Technical Field

The present invention relates to a route point setting device that sets route points on a flight route of an aircraft, and a route point setting program.

2. Related Art

Conventional setting of a flight route of an aircraft involves setting route points between a predetermined start point and arrival point, and setting the flight route so as to be routed by these route points. For example, Japanese Patent No. 3557445 describes obtaining an evaluation value regarding all inter-point routes between candidate waypoints from a start point to an arrival point, based on a database recording multiple waypoints and inter-point routes, and selecting waypoints to fly by whereby the accumulated value of the evaluation values is the smallest.

SUMMARY OF THE INVENTION

There are cases in setting aircraft flight routes where flight routes are set and displayed as a continuation of multiple cells (grids) on map data divided into a grid. In such a case, a flight route simply following the continuation of cells would result in a jagged route in accordance with the division of the cells, requiring frequent steering operations.

Thus, it is desirable to enable setting of a smooth linear flight route that is more realistic for flight, by setting suitable route points on a gridded flight route.

A first aspect of the present invention provides a route point setting device that sets route points on a flight route from a predetermined first point to a predetermined second point. The route point setting device includes: a grid divider that divides map information into a plurality of cells in grid form on a horizontal plane, the map information including at least the first point and the second point; a cell route setter that sets a cell route including consecutive cells from the first point to the second point on the map information subjected to the grid division by the grid divider; a calculator that calculates a bending angle of the cell route at each cell on the cell route; and a route point setter that performs comparing the bending angle at any cell calculated by the calculator, with the bending angles at two cells adjacent to the any cell and respectively ahead of and behind the any cell on the cell route, and setting the any cell as a route point in a case where the bending angle $\theta_n$ at this cell satisfies an expression $$\theta_{n-1} \geq \theta_n < \theta_{n+1}$$

where $\theta_{n-1}$ represents the bending angle at the cell behind and adjacent to the any cell behind on the cell route, and $\theta_{n+1}$ represents the bending angle at the cell ahead of and adjacent to the any cell on the cell route, the any cell including all cells on the cell route.

The route point setter may perform the comparing of the bending angle at each cell, sequentially following the cell route, having started at either of one of the first point and the second point. In a case where the bending angle of the cell where the comparing is being performed has consecutively been smaller than the bending angle at the immediately previous cell for a predetermined number of times or more, the cell where the comparing is being performed may be set as the route point.

The calculator may calculate, for any cell on the cell route, two vectors that each are a vector from the any cell to a cell backwards by a predetermined number of cells on the cell route and a vector from the any cell to a cell forwards by the predetermined number of cells on the cell route, and calculate an angle formed by the two vectors as the bending angle.

A second aspect of the present invention provides a route point setting program that sets route points on a flight route from a predetermined first point to a second point. The program causes a computer to perform: a grid dividing function of dividing map information into a plurality of cells in grid form on a horizontal plane, the map information including at least the first point and the second point; a route setting function of setting a cell route including consecutive cells from the first point to the second point on the map information subjected to the grid division by the grid dividing function; a calculating function of calculating a bending angle of the cell route at each cell on the cell route; and a route point setting function of performing comparing the bending angle at any cell calculated by the calculating function, with the bending angles at two cells adjacent to and respectively ahead of and behind the any cell on the cell route, and setting the any cell as a route point in a case where the bending angle $\theta_n$ at the any cell satisfies an expression $$\theta_{n-1} \geq \theta_n < \theta_{n+1}$$

where $\theta_{n-1}$ represents the bending angle at the cell behind and adjacent to the any cell on the cell route, and $\theta_{n+1}$ represents the bending angle at the cell ahead of and adjacent to the any cell on the cell route, the any cell including all cells on the cell route.

DETAILED DESCRIPTION

An implementation of the present invention will be described with reference to the drawings.

Configuration

Figure 1:
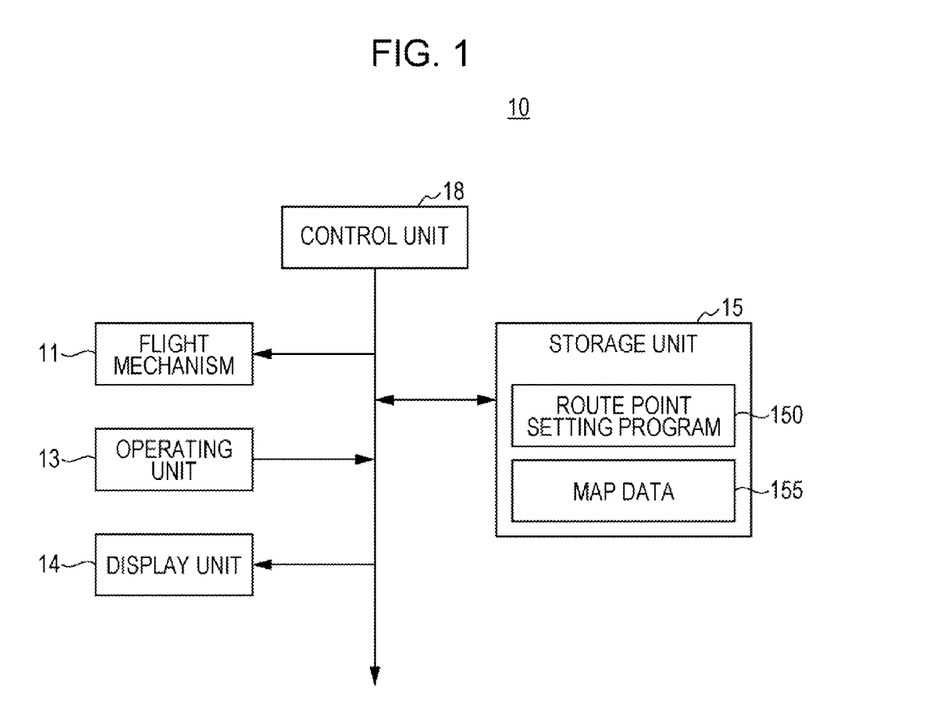
FIG. 1 is a block diagram illustrating the functional configuration of an aircraft according to an implementation.

The configuration of a route point setting device according to the present invention will be described with reference to FIG. 1. FIG. 1 is a block diagram illustrating the functional configuration of an aircraft 10 to which the route point setting device according to the implementation of the present invention has been applied.

The aircraft 10 carries out flight from a predetermined departure point $P_S$ to arrival point $P_E$ (see FIG. 3), and includes a flight mechanism 11, an operating unit 13, a display unit 14, a storage unit 15, a control unit 18, and so forth, as illustrated in FIG. 1. The flight mechanism 11 is a mechanism that causes the aircraft 10 to fly, and primarily includes a main rotor that generates lift necessary for the aircraft to fly, and an internal combustion engine (e.g., a jet engine) that generates thrust.

The operating unit 13 includes a control stick, various types of operating keys, and so forth. Signals corresponding to the operation state of these control stick, various types of operating keys, and so forth, are output to the control unit 18. The display unit 14 includes a display, and displays various types of information on the display based on display signals input from the control unit 18.

The storage unit 15 is memory that stores programs and data to realize the various functions of the aircraft 10, and also functions as work area. The storage unit 15 according to the present implementation stores a route point setting program 150 according to the implementation of the present invention, map data 155, and so forth. The route point setting program 150 is a program that causes the control unit 18 to execute later-described route point setting processing (see FIGS. 2A and 2B). The map data 155 has comprehensive geographical information including, in addition to land features such as mountains, rivers, and so forth, information relating to the state of usage of land, such as roads and railways, buildings, fields, and so forth. The map data 155 may be information of a predetermined range including at least the departure point $P_S$ and arrival point $P_E$ (see FIG. 3).

The control unit 18 centrally controls the parts of the aircraft 10. Specifically, the control unit 18 performs such as controlling the operations of the flight mechanism 11 and so forth, loading a specified program from programs stored in the storage unit 15 and executing various processes cooperatively with the loaded program, and so forth, based on pilot operations at the operating unit 13.

Operations

Figure 2A:
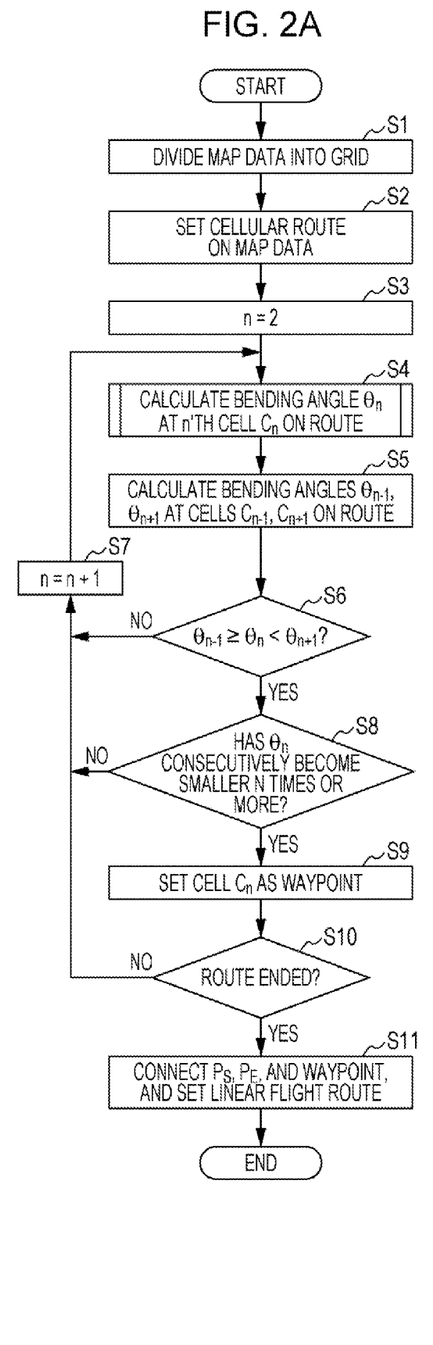
FIGS. 2A and 2B are flowcharts illustrating route point setting processing.
Figure 2B:
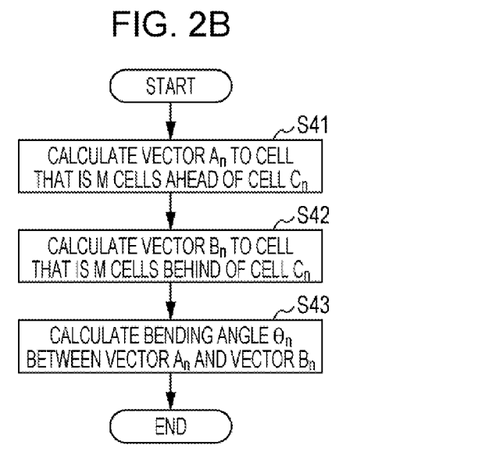

Next, operations at the time of the aircraft 10 performing the route point setting processing will be described with reference to FIGS. 2A through 6. FIGS. 2A and 2B are flowcharts illustrating route point setting processing, and FIGS. 3 through 6 are diagrams illustrating route point setting processing.

Route point setting processing is processing where waypoints $P_W$ (see FIG. 6), which are route points, are set on a cell-shaped flight route of the map data that has been divided into a grid, thus enabling setting of a linear flight route that is more realistic for flight. Thus route point setting processing is executed by the control unit 18 reading out and loading the route point setting program 150 from the storage unit 15 upon an execution instruction for the route point setting processing being input by pilot operations or the like.

Figure 3:
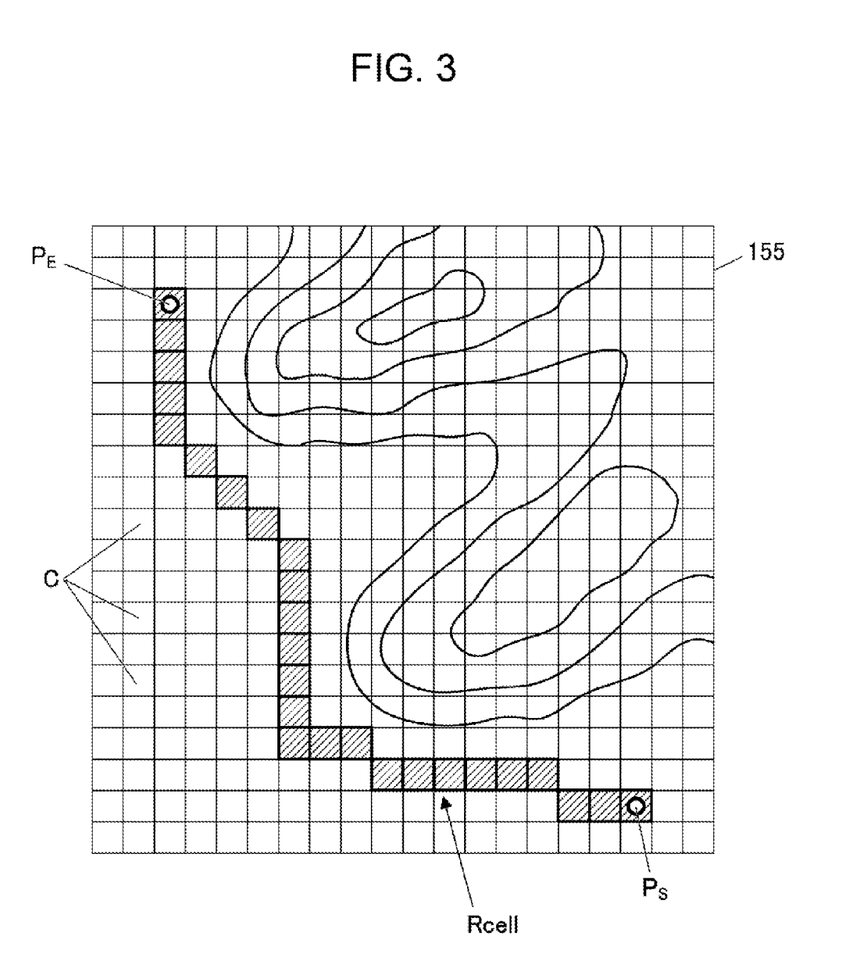
FIG. 3 is a diagram illustrating route point setting processing.

When route point setting processing is executed, the control unit 18 first reads map data 155 from the storage unit 15 within a predetermined range including at least the departure point $P_S$ and the arrival point $P_E$, and divides the map data 155 into a grid form of multiple cells C in a horizontal plane, as illustrated in FIGS. 2A and 3 (step S1). The control unit 18 generates the multiple cells C as a square grid along the division lines that run north-south and east-west on the map data 155 in the implementation. Each square is 50 meters each way. The shape of the cells does not have to be square, as long as a grid is realized. For example, a rhombic grid, a hexagonal grid (honeycomb), or the like, may be used.

Next, the control unit 18 sets a cell route Rcell made up of multiple cells C, continuing from the departure point $P_S$ to the arrival point $P_E$, on the map data 155 divided into the grid in step S1 (step S2). This cell route Rcell may be, for example, searched and set based on land feature formations or the like using a route search program omitted from illustration, or may be input by a pilot or an operator belonging to ground crew, or the like. Note that in the following description, the notation $C_n$ represents an n'th (where n=1, 2, . . . ) cell C from the departure point $P_S$ on the cell route Rcell, thus distinguishing the cells C on the cell route Rcell.

The control unit 18 sequentially evaluates each cell C on the cell route Rcell, regarding whether or not that cell C should be set as a waypoint $P_W$. In the present implementation, the control unit 18 first sets n=2, so as to start evaluation of $C_2$ which is the second cell C from the departure point $P_S$ (step S3) Note however, that evaluation may be started from cell $C_3$ or a later cell C, which will be described later.

Figure 4A:
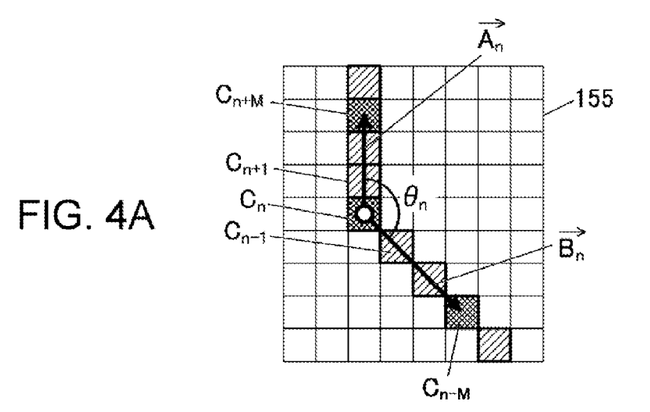
FIGS. 4A through 4C are diagrams illustrating route point setting processing.
Figure 4B:
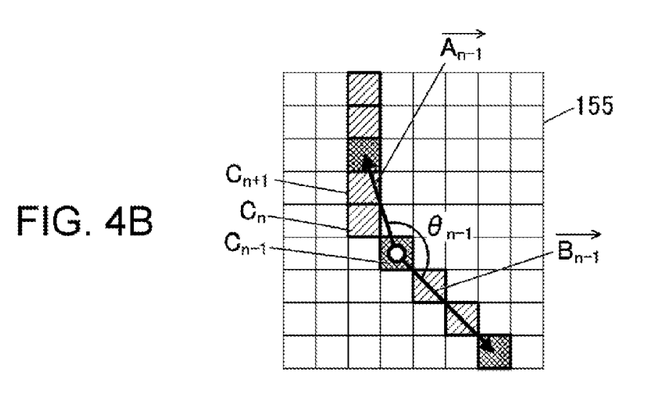

Next, the control unit 18 calculates a bending angle $\theta_n$ on the cell route Rcell for the cell $C_n$ (step S4). The control unit 18 performs the calculation of this bending angle $\theta_n$ by first calculating a vector $A_n$ to cell $C_n$+M which is M cells (three in FIG. 4A) ahead of the cell $C_n$ on the cell route Rcell (step S41), and calculates a vector $B_n$ to cell $C_n$−M which is M cells behind the cell $C_n$ on the cell route Rcell (step S42), as illustrated in FIGS. 2B and 4A. M is an optional integer, and may be set as appropriate according to the grid size and so forth. The control unit 18 then calculates the bending angle $\theta_n$ as the angle between the vector $A_n$ and vector $B_n$ (step S43).

In order to calculate the vector $B_n$, there has to be a number of cells C corresponding to the value of M behind the cell $C_n$. Further, calculation of a similar vector $B_{n−1}$ will be performed in later-described step S5 at cell $C_{n−1}$, so the number of cells C necessary behind the cell $C_n$ increases by one, accordingly. Accordingly, the initial value of n in step S3 above is set such that vectors $B_n$ and $B_{n−1}$ can be calculated according to the set value of M. Note however, that the value of M does not have to be fixed over the entire cell route Rcell, and may be changed as needed.

Further, a bending angle $\theta_{n+1}$ of cell $C_{n+1}$ that is adjacent ahead the cell $C_n$ on the cell route Rcell is calculated in later-described step S5. Note however, in a case where the bending angle $\theta_n$ of cell $C_n$ has already been calculated as bending angle $\theta_{n+1}$ of cell $C_{n+1}$ at the immediately-previous n, recalculation does not have to be performed, and this value can be used as it is.

Figure 4C:
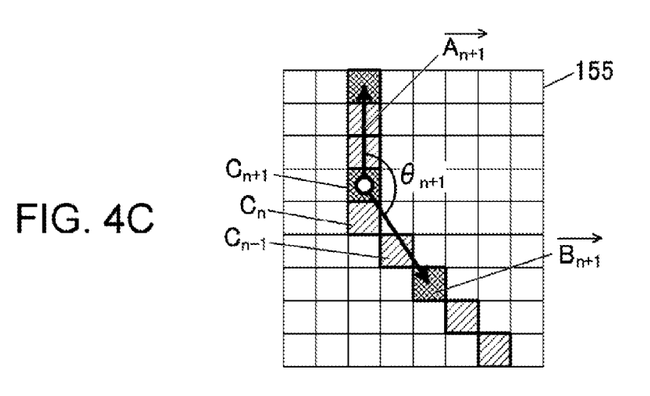

The two bending angles $\theta_{n−1}$ and $\theta_{n+1}$ at the two adjacent cells to cell $C_n$ which are cells $C_{n−1}$ and $C_{n+1}$, are calculated in the same way as with the cell $C_n$ (step S5). That is to say, the control unit 18 calculates the vector $A_{n−1}$ and vector $B_{n−1}$ at cell $C_{n−1}$, and calculates the bending angle $\theta_{n−1}$ as the angle formed therebetween (FIG. 4B), and also calculates the vector $A_{n+1}$ and vector $B_{n+1}$ at cell $C_{n+1}$, and calculates the bending angle $\theta_{n+1}$ as the angle formed therebetween (FIG. 4C). Note however, in a case where the bending angle $\theta_{n−1}$ of cell $C_{n−1}$ has already been calculated as bending angle $\theta_n$ of cell $C_n$ at the immediately-previous n, recalculation does not have to be performed, and this value can be used as it is.

Next, the control unit 18 determines whether or not the bending angle $\theta_n$ of the cell $C_n$ satisfies the following Expression (1) (step S6).

$$\theta_{n-1} \geq \theta_n < \theta_{n+1} \qquad \text{Expression (1)}$$

In a case where determination is made that the bending angle $\theta_n$ of the cell $C_n$ does not satisfy Expression (1) (No in step S6), the control unit 18 updates n by incrementing n by 1 (step S7), and transitions to the above-described step S4. That is to say, in this case, evaluation shifts to the cell C following the current cell $C_n$, without setting the cell $C_n$ as a waypoint $P_W$.

In a case where determination is made in step S6 that the bending angle $\theta_n$ of the cell $C_n$ satisfies Expression (1) (Yes in step S6), the control unit 18 determines whether or not the bending angle $\theta_n$ has consecutively been smaller than the bending angle $\theta_n$ at the immediately previous n (i.e., the bending angle $\theta_{n-1}$ as to the current n) for N times or more (i.e., whether or not $\theta_n < \theta_{n-1}$ is satisfied) (step S8). Note that N is an optional integer.

In a case where determination is made in step S8 that the bending angle $\theta_n$ of the cell $C_n$ has not consecutively been smaller than the bending angle $\theta_n$ at the immediately previous n for N times or more (No in step S8), the control unit 18 updates n by incrementing n by 1 (step S7), and transitions to the above-described step S4. That is to say, in this case, evaluation shifts to the cell C following the current cell $C_n$, without setting the cell $C_n$ as a waypoint $P_W$.

In a case where determination is made in step S8 that the bending angle $\theta_n$ of the cell $C_n$ has consecutively been smaller than the bending angle $\theta_n$ at the immediately previous n for N times or more (Yes in step S8), the control unit 18 sets the position of the current cell $C_n$ as a waypoint $P_W$ (step S9). Accordingly, the cell $C_n$ is set as a waypoint $P_W$ in a case where the bending angle $\theta_n$ satisfies $\theta_{n-1} \leq \theta_n < \theta_{n+1}$, and also the bending angle $\theta_n$ has consecutively been smaller than the bending angle $\theta_n$ at the immediately previous n for N times or more, from the determinations made in steps S6 and S8.

Figure 5A:
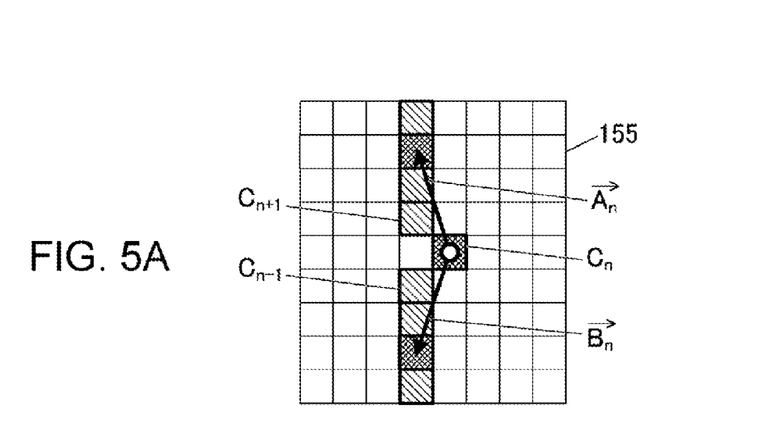
FIGS. 5A through 5C are diagrams illustrating route point setting processing.
Figure 5B:
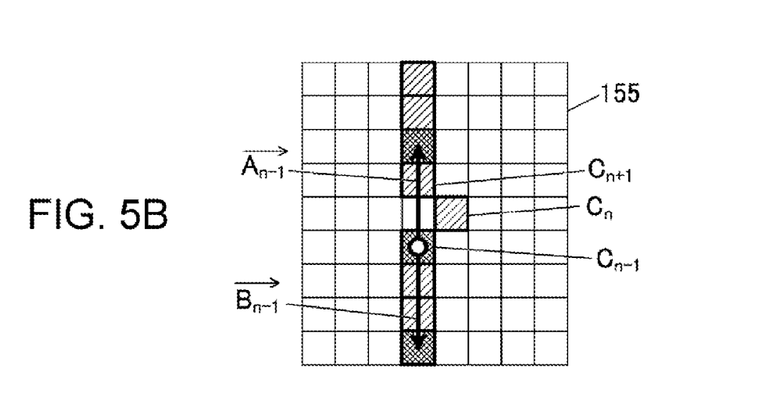
Figure 5C:
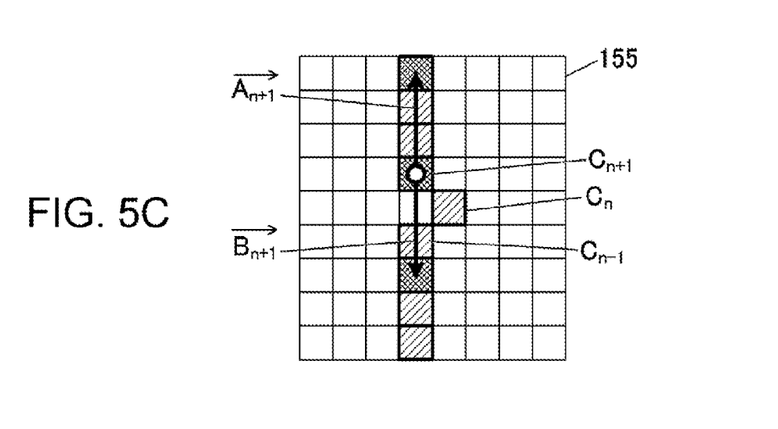

Now, a vertex on the cell route Rcell where the direction of advance of the cell route Rcell changes greatly, is searched as a cell C to be set as a waypoint $P_W$ in the determination in step S6 (determination regarding whether or not the bending angle $\theta_n$ satisfies $\theta_{n-1} \geq \theta_n < \theta_{n+1}$). However, a cell C determined to be a vertex on the cell route Rcell may be in appropriately set as a waypoint $P_W$ in step S6, if the vectors $A_n$ and $B_n$ do not properly represent the direction of travel, as illustrated in FIGS. 5A through 5C, for example. Accordingly, the determination in step S8 (determination of whether or not the bending angle $\theta_n$ has consecutively been smaller than the bending angle $\theta_n$ at the immediately previous n for N times or more) confirms that the bending angle $\theta_n$ is sequentially changing with a constant tendency, thereby preventing inappropriate waypoints $P_W$ from being set.

Next, the control unit 18 determines whether or not evaluation of waypoint $P_W$ settings regarding each cell C on the cell route Rcell have been completed to the end of this cell route Rcell, as illustrated in FIG. 2A (step S10). In a case where determination is made that evaluation of waypoint $P_W$ settings have not been completed to the end of this cell route Rcell (No in step S10), the control unit 18 updates n by incrementing n by 1 (step S7), and transitions to the above-described step S4. That is to say, evaluation shifts to the cell C following the current cell $C_n$.

Figure 6:
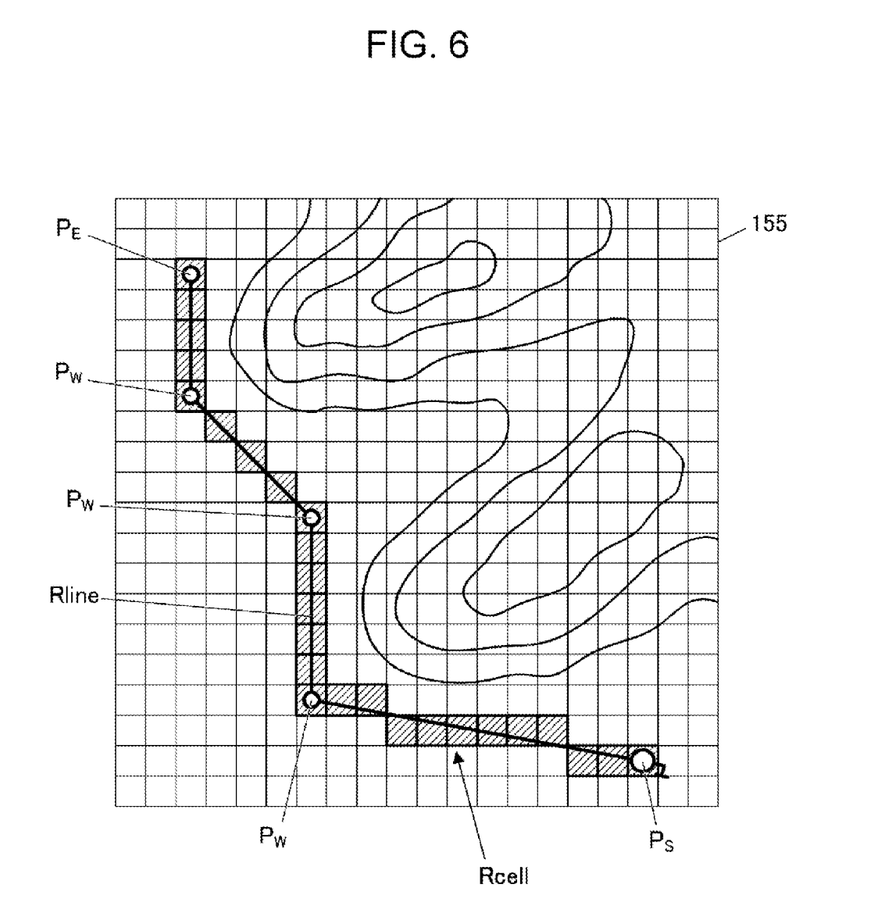
FIG. 6 is a diagram illustrating route point setting processing.

On the other hand, in a case where determination is made in step S10 that evaluation of waypoint $P_W$ settings have been completed to the end of this cell route Rcell (Yes in step S10), the control unit 18 sets a linear flight route Rline sequentially connecting the departure point $P_S$, waypoints $P_W$, and arrival point $P_E$ by straight lines along the cell route Rcell as illustrated in FIG. 6 (step S11), displays this on the display of the display unit 14 if necessary, and ends the route point setting processing.

Advantages

As described above, according to the present implementation, the bending angle $\theta_n$ of the cell route Rcell is calculated at each cell $C_n$ of the cell route Rcell, and this cell $C_n$ is set as a waypoint $P_W$ if the calculated bending angle $\theta_n$ of the cell $C_n$ satisfies $\theta_{n-1} \geq \theta_n < \theta_{n+1}$, regarding the bending angles $\theta_{n-1}$ and $\theta_{n+1}$ at the two adjacent cells to cell $C_n$ on the cell route Rcell which are cells $C_{n-1}$ and $C_{n+1}$. Thus, a cell C on the cell route Rcell where the direction of advance changes relatively greatly is set as a waypoint $P_W$ at which direction of flight should be changed, and the departure point $P_S$, waypoints $P_W$, and arrival point $P_E$ are linearly connected following the cell route Rcell, whereby a smoother linear flight route Rline can be set. Accordingly, waypoints $P_W$ can be appropriately set on the gridded cell route Rcell, enabling setting of a smooth linear flight route Rline that is more realistic for flight.

Also, comparison of bending angles $\theta_n$ at each cell $C_n$ is sequentially performed following the cell route Rcell, and if the bending angle $\theta_n$ at the cell $C_n$ where this comparison is being performed has consecutively been smaller than the bending angle $\theta_n$ at the immediately previous cell $C_n$ a predetermined number of times or more, the cell $C_n$ at which this comparison has been performed is set as a waypoint $P_W$. Accordingly, even in a case of a cell route Rcell where the calculated bending angle $\theta_n$ does not properly represent the direction of advance, inappropriate waypoints $P_W$ can be prevented from being set, by confirming that the bending angle $\theta_n$ is sequentially changing with a constant tendency.

Modifications

Note that implementations to which the present invention can be applied are not limited to the above-described implication. Modifications may be made as suitable without departing from the essence of the present invention. For example, description has been made in the above implementation that evaluation of whether or not to set each cell C on the cell route Rcell as a waypoint $P_W$ is sequentially performed from the departure point $P_S$ following the cell route Rcell, but this may be sequentially performed from the arrival point $P_E$ as long as the cell route Rcell is being followed.

In the implementation, the route point setting device to the aircraft 10, but the present invention is not limited to this arrangement. For example, the route point setting device may be provided within ground equipment that performs communication with the aircraft 10, or the like.

The invention claimed is:

1. A route point setting device that sets route points on a flight route from a predetermined first point to a predetermined second point, the route point setting device comprising:
   a grid divider that divides map information into a plurality of cells in grid form on a horizontal plane, the map information including at least the first point and the second point;
   a cell route setter that sets a cell route including consecutive cells from the first point to the second point on the map information subjected to the grid division by the grid divider;
   a calculator that calculates a bending angle of the cell route at each cell on the cell route; and
   a route point setter that performs comparing the bending angle at any cell calculated by the calculator, with the bending angles at two cells adjacent to the any cell and respectively ahead of and behind the any cell on the cell route, and setting the any cell as a cell route point in a case where the bending angle $\theta_n$ at the any cell satisfies an expression $$\theta_{n-1} \geq \theta_n < \theta_{n+1}$$

where, in a direction from either one of the first and second points to the other point, $\theta_{n-1}$ represents the bending angle at the cell adjacent on a start point side to the any cell on the cell route, and $\theta_{n+1}$ represents the bending angle at the cell adjacent on an end point side to the any cell on the cell route, the any cell including all cells on the cell route.

2. The route point setting device according to claim 1, wherein the route point setter performs the comparing of the bending angle at each cell, sequentially following the cell route, having started at either one of the first point and the second point, and wherein, in a case where the bending angle of the cell where the comparing is being performed has consecutively been smaller than the bending angle at the immediately previous cell for a predetermined number of times or more, the cell where the comparing is being performed is set as the route point.

3. The route point setting device according to claim 1, wherein the calculator calculates, for any cell on the cell route, two vectors that each are a vector from the any cell to a cell backwards by a predetermined number of cells on the cell route and a vector from the any cell to a cell forwards by the predetermined number of cells on the cell route, and calculates an angle formed by the two vectors as the bending angle.

4. The route point setting device according to claim 2, wherein the calculator calculates, for any cell on the cell route, two vectors that each are a vector from the any cell to a cell backwards by a predetermined number of cells on the cell route and a vector from the any cell to a cell forwards by the predetermined number of cells on the cell route, and calculates an angle formed by the two vectors as the bending angle.

5. A route point setting program stored on a non-transitory computer readable medium that sets route points on a flight route from a predetermined first point to a second point, the program causing a computer to perform:

a grid dividing function of dividing map information into a plurality of cells in grid form on a horizontal plane, the map information including at least the first point and the second point;

a cell route setting function of setting a cell route including consecutive cells from the first point to the second point on the map information subjected to the grid division by the grid dividing function;

a calculating function of calculating a bending angle of the cell route at each cell on the cell route; and a route point setting function of performing comparing the bending angle at any cell calculated by the calculating function, with the bending angles at two cells adjacent to and respectively ahead of and behind the any cell on the cell route, and setting the any cell as a route point in a case where the bending angle at the any cell satisfies an expression $$\theta_{n-1} \geq \theta_n < \theta_{n+1}$$

where, in a direction from either one of the first and second points to the other point, $\theta_{n-1}$ represents the bending angle at the cell adjacent on an end point side to the any cell on the cell route, and $\theta_{n+1}$ represents the bending angle at the cell adjacent on a start point side to the any cell on the cell route, the any cell including all cells on the cell route.

* * * * *